(12) United States Patent
Cho

(10) Patent No.: US 12,115,861 B2
(45) Date of Patent: Oct. 15, 2024

(54) METHOD AND SYSTEM FOR CONTROLLING ANTI-JERK OF VEHICLE

(71) Applicants: Hyundai Motor Company, Seoul (KR); Kia Corporation, Seoul (KR)

(72) Inventor: Woo Cheol Cho, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 216 days.

(21) Appl. No.: 17/867,977

(22) Filed: Jul. 19, 2022

(65) Prior Publication Data

US 2023/0256836 A1 Aug. 17, 2023

(30) Foreign Application Priority Data

Feb. 15, 2022 (KR) .......................... 10-2022-0019279

(51) Int. Cl.
*B60L 15/20* (2006.01)
*B60W 10/08* (2006.01)

(52) U.S. Cl.
CPC ......... *B60L 15/2036* (2013.01); *B60W 10/08* (2013.01); *B60W 2710/026* (2013.01)

(58) Field of Classification Search
CPC ............... B60L 15/2036; B60W 10/08; B60W 2710/026
USPC .......................................................... 701/22
See application file for complete search history.

(56) References Cited

U.S. PATENT DOCUMENTS

| | | | | |
|---|---|---|---|---|
| 8,457,823 | B2 * | 6/2013 | Falkenstein | B60W 10/08 477/3 |
| 9,037,364 | B2 * | 5/2015 | Bang | B60L 15/00 701/53 |
| 9,428,184 | B2 * | 8/2016 | Kikuchi | B60W 30/025 |
| 11,161,515 | B1 * | 11/2021 | Kang | B60W 30/025 |
| 2009/0082173 | A1 * | 3/2009 | Taal | F16H 61/20 477/92 |
| 2010/0133046 | A1 * | 6/2010 | Allwardt | B66B 7/123 187/251 |
| 2011/0137514 | A1 * | 6/2011 | Itabashi | B60W 30/188 701/31.4 |
| 2014/0145498 | A1 * | 5/2014 | Yamakado | B60T 8/245 303/3 |
| 2019/0105990 | A1 * | 4/2019 | Cho | B60L 7/18 |
| 2019/0210598 | A1 * | 7/2019 | Endo | B62D 15/0285 |

(Continued)

FOREIGN PATENT DOCUMENTS

| | | | | |
|---|---|---|---|---|
| AT | 515103 B1 * | 6/2015 | | B60W 10/02 |
| DE | 19612455 A1 * | 10/1997 | | F02D 11/105 |

(Continued)

*Primary Examiner* — Atul Trivedi
(74) *Attorney, Agent, or Firm* — Morgan, Lewis & Bockius LLP

(57) ABSTRACT

A method of controlling anti-jerk of a vehicle, includes determining a correction factor based on a wheel slip amount of the vehicle, determining a corrected model speed from a predetermined model speed for a motor of the vehicle based on the correction factor and a motor speed of the vehicle from which a vibration component is removed, determining a vibration component based on the motor speed and the corrected model speed and generating an anti-jerk torque based on the determined vibration component, and generating a final output torque of the motor based on a driver demand torque of the vehicle and the generated anti-jerk torque.

16 Claims, 10 Drawing Sheets

(56) References Cited

U.S. PATENT DOCUMENTS

| | | | |
|---|---|---|---|
| 2020/0088756 A1* | 3/2020 | Oh | B60W 40/105 |
| 2020/0148063 A1* | 5/2020 | Dastoor | B60L 58/12 |
| 2020/0307544 A1* | 10/2020 | Lee | B60W 40/105 |
| 2021/0023944 A1* | 1/2021 | Ravichandran | B60K 23/0808 |
| 2021/0061256 A1* | 3/2021 | Shin | B60K 6/48 |
| 2021/0179147 A1* | 6/2021 | Kang | B60W 40/068 |
| 2021/0370967 A1* | 12/2021 | Valeri | B60W 50/04 |
| 2023/0256836 A1* | 8/2023 | Cho | B60L 3/104 |
| | | | 701/22 |

FOREIGN PATENT DOCUMENTS

| | | | | |
|---|---|---|---|---|
| DE | 10308700 B4 | * | 9/2014 | B60T 7/122 |
| EP | 2341235 A1 | * | 7/2011 | B60L 15/2054 |
| EP | 3219562 A1 | * | 9/2017 | B60W 10/06 |
| FR | 3048938 A1 | * | 9/2017 | B60W 10/06 |
| GB | 2544763 A | * | 5/2017 | B60K 6/22 |
| GB | 2544764 A | * | 5/2017 | B60K 6/22 |
| GB | 2552940 A | * | 2/2018 | B60W 10/20 |
| KR | 20170001880 A | * | 1/2017 | F16H 61/4183 |
| WO | WO-2012124626 A1 | * | 9/2012 | B60K 6/485 |
| WO | WO-2014054432 A1 | * | 4/2014 | B60L 15/20 |

* cited by examiner

METHOD AND SYSTEM FOR CONTROLLING ANTI-JERK OF VEHICLE

CROSS-REFERENCE TO RELATED APPLICATION

The present application claims priority to Korean Patent Application No. 10-2022-0019279, filed on Feb. 15, 2022, the entire contents of which is incorporated herein for all purposes by this reference.

BACKGROUND OF THE PRESENT DISCLOSURE

Field of the Present Disclosure

The present disclosure relates to a method and a system for controlling anti-jerk of a vehicle, and more particularly, to a method and a system for controlling anti-jerk of a vehicle configured to improve drivability when wheel slip occurs.

Description of Related Art

Among vehicles, a vehicle that utilizes a motor as power, such as an electric vehicle, reduces vibration through anti-jerk control of the motor. It may be said that it is most important to accurately extract a vibration component for anti-jerk control of the motor.

Generally, the vibration component is extracted using the difference between the actual speed of the motor and the model speed of the motor, and the model speed of the motor is calculated based on the wheel speed of the vehicle.

Conventionally, there has been a problem in that, when wheel slip occurs while a vehicle starts on a low-friction road surface, the wheel slip component is mis-extracted as a vibration component, distorting the vibration component. In the case in which the wheel slip component is mis-extracted as a vibration component, when the vibration component including the wheel slip component is high-pass filtered, an erroneous component is not removed, resulting in distortion of the vibration component.

Accordingly, there may occur a problem in that, at the initial stage of occurrence of wheel slip, the vehicle excessively reduces the slip, and when torque is increased after the slip is stabilized, the vehicle excessively increases the torque.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and a system for controlling anti-jerk of a vehicle that substantially obviate one or more problems due to limitations and disadvantages of the related art.

Various aspects of the present disclosure are directed to providing a method and a system for controlling anti-jerk of a vehicle configured for removing a wheel slip component from a vibration component by correcting a model speed of a motor during anti-jerk control when wheel slip of the vehicle occurs.

Accordingly, the method and the system for controlling anti-jerk of a vehicle of the present disclosure may solve the related art problem in that a wheel slip component is included in a vibration component, causing the vibration component to be incorrectly extracted, and vibration reduction performance and wheel slip control performance of the vehicle deteriorate due to erroneous extraction of the vibration component.

Various aspects of the present disclosure are directed to providing a method and a system for controlling anti-jerk of a vehicle configured to focus on wheel slip control and disable anti-jerk control when wheel slip having a predetermined size or more occurs.

Accordingly, the method and the system for controlling anti-jerk of a vehicle of the present disclosure may remedy the related art problem in that mutual collision occurs while wheel slip control and anti-jerk control are simultaneously performed when wheel slip of a vehicle occurs, and may secure vehicle safety.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, there is provided a method of controlling anti-jerk of a vehicle, the method including determining a correction factor based on a wheel slip amount of the vehicle, determining a corrected model speed from a predetermined model speed for a motor of the vehicle based on the correction factor and a motor speed of the vehicle from which a vibration component is removed, determining a vibration component based on the motor speed and the corrected model speed and generating an anti-jerk torque based on the determined vibration component, and generating a final output torque of the motor based on a driver demand torque of the vehicle and the generated anti-jerk torque.

The wheel slip amount of the vehicle may be determined based on the difference between the motor speed of the vehicle and the speed of the vehicle.

The correction factor may be determined in proportion to the wheel slip amount when the controller concludes that the wheel slip amount of the vehicle is greater than a predetermined first threshold value and smaller than a predetermined second threshold value.

The motor speed of the vehicle from which the vibration component is removed may be determined by low-pass filtering the motor speed of the vehicle, and may include a wheel slip component.

The correction factor may have a value from 0 to 1, and the corrected model speed may be determined by adding a first result value obtained by multiplying the correction factor by the motor speed of the vehicle from which the vibration component is removed, to a second result value obtained by multiplying the predetermined model speed by a value obtained by subtracting the correction factor from 1.

The anti-jerk torque may be generated by high-pass filtering the vibration component, phase delaying the high-pass filtered vibration component, and applying a predetermined gain value to the phase-delayed vibration component.

In another aspect of the present disclosure, a system for controlling anti-jerk of a vehicle is provided. The system may be configured to determine a wheel slip amount of the vehicle, turn off an anti-jerk control function of the vehicle and turn on a wheel slip control function of the vehicle when the controller concludes that the wheel slip amount is greater than a predetermined first threshold value, and maintain existing control of the vehicle when the controller concludes that the wheel slip amount is less than or equal to the predetermined first threshold value.

The method of controlling anti-jerk of a vehicle may further include turning on the anti-jerk control function when the controller concludes that the wheel slip amount is smaller than a predetermined second threshold value after turning off the anti-jerk control function of the vehicle.

In another aspect of the present disclosure, a system for controlling anti-jerk of a vehicle is provided. The system may include a sensor unit, and a controller electrically connected to the sensor unit, wherein the controller may be configured to determine a wheel slip amount of the vehicle from an output signal of the sensor unit, and determine a correction factor based on the wheel slip amount, determine a corrected model speed from a predetermined model speed for a motor of the vehicle based on the correction factor and a motor speed of the vehicle from which a vibration component is removed, determine a vibration component based on the motor speed and the corrected model speed, generate an anti-jerk torque based on the determined vibration component, and generate a final output torque of the motor based on a driver demand torque of the vehicle and the generated anti-jerk torque.

The controller may be configured to determine the wheel slip amount based on the difference between the motor speed of the vehicle and the speed of the vehicle.

The correction factor may be determined in proportion to the wheel slip amount when the controller concludes that the wheel slip amount of the vehicle is greater than a predetermined first threshold value and smaller than a predetermined second threshold value.

The controller may be configured to determine the motor speed of the vehicle from which the vibration component is removed by low-pass filtering the motor speed of the vehicle, and the motor speed of the vehicle from which the vibration component is removed may include a wheel slip component.

The correction factor may have a value from 0 to 1, and the controller may add a first result value obtained by multiplying the correction factor by the motor speed of the vehicle from which the vibration component is removed, to a second result value obtained by multiplying the predetermined model speed by a value obtained by subtracting the correction factor from 1, to determine the corrected model speed.

The controller may be configured to generate the anti-jerk torque by high-pass filtering the vibration component, phase delaying the high-pass filtered vibration component, and applying a predetermined gain value to the phase-delayed vibration component.

In another aspect of the present disclosure, a system for controlling anti-jerk of a vehicle is provided. The system may include a sensor unit, and a controller electrically connected to the sensor unit, wherein the controller may be configured to determine a wheel slip amount of the vehicle from an output signal of the sensor unit, turn off an anti-jerk control function of the vehicle and turn on a wheel slip control function of the vehicle when the controller concludes that the wheel slip amount is greater than a predetermined first threshold value, and maintain existing control of the vehicle when the controller concludes that the wheel slip amount is less than or equal to the predetermined first threshold value.

The controller may further be configured to turn on the anti-jerk control function when the controller concludes that the wheel slip amount is smaller than a predetermined second threshold value after turning off the anti-jerk control function of the vehicle.

It is to be understood that both the foregoing general description and the following detailed description of the present disclosure are exemplary and explanatory and are intended to provide further explanation of the present disclosure as claimed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The accompanying drawings, which are included to provide a further understanding of the present disclosure and are incorporated in and constitute a part of the present application, illustrate embodiment(s) of the present disclosure and together with the description serve to explain the principle of the present disclosure. In the drawings.

Figure 1:
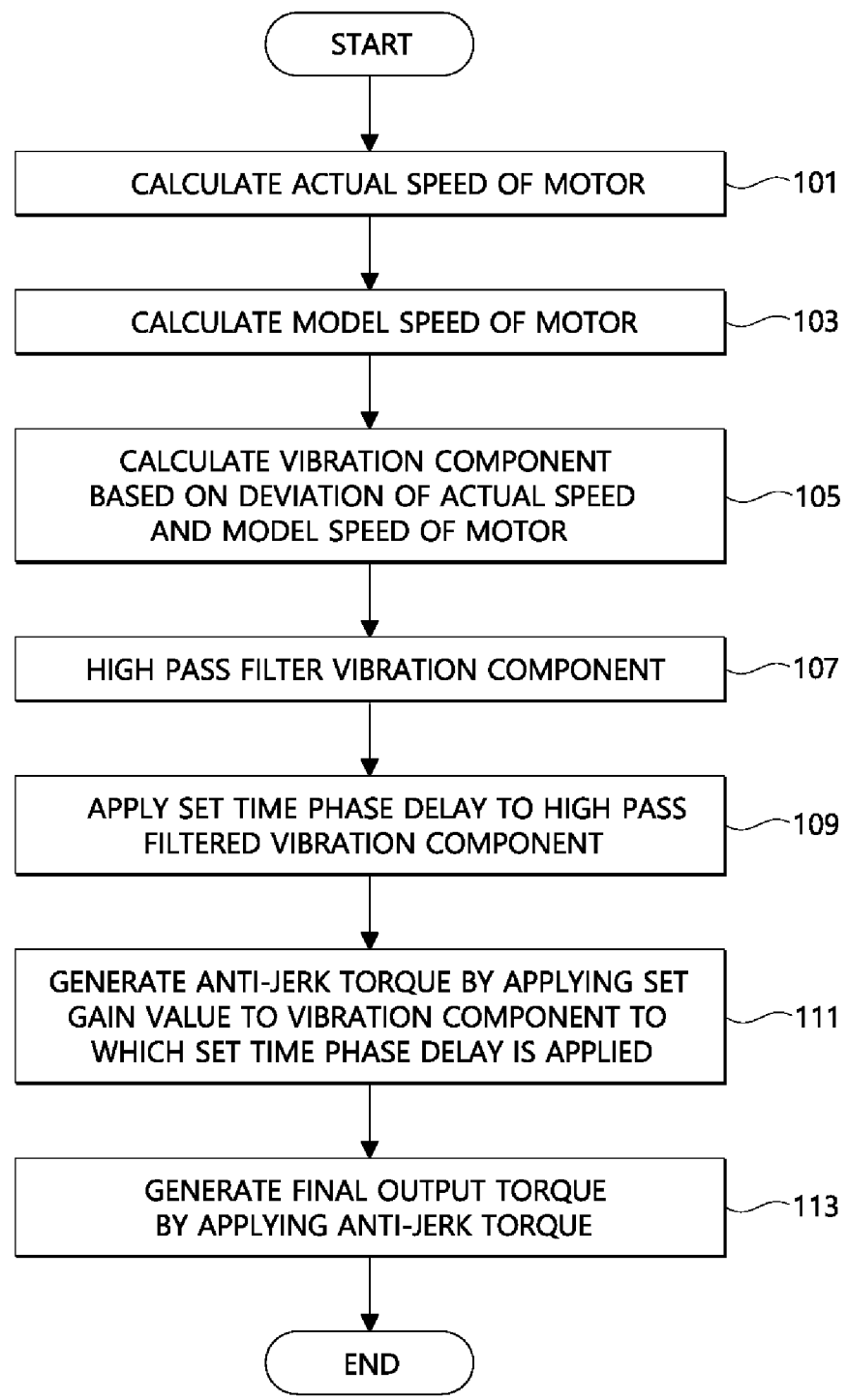
FIG. 1 is a flowchart for explaining a related art method of controlling anti-jerk of a vehicle.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Wherever possible, the same reference numbers will be used throughout the drawings to refer to the same or like parts. This specification does not describe all elements of the embodiments, and overlaps between general contents or embodiments in the technical field to which an exemplary embodiment of the present disclosure pertains are omitted. The term "unit, module, device" used in the specification may be implemented by software or hardware, and according to various exemplary embodiments of the present disclosure, a plurality of "units, modules, devices" may be implemented as one component. It is also possible that one "unit, module, device" includes a plurality of components.

Throughout the specification, when a part is "connected" to another part, it includes a case in which parts are directly connected to each other as well as a case in which parts are indirectly connected to each other. An indirect connection includes being connected through a wireless communication network.

Throughout the specification, when an element is referred to as "including" another element, the element may include other elements as well, without excluding other elements, unless specifically stated otherwise.

Furthermore, the terms "first", "second", etc. are used to distinguish one element from another, and elements are not limited by the terms.

A singular representation may include a plural representation unless the context clearly indicates otherwise.

In each step, the identification code is used for convenience of explanation. The identification code does not describe the order of each step, and each step may be executed differently from the specified order unless a specific order is clearly stated in the context.

FIG. 1 is a flowchart for explaining a related art method of controlling anti-jerk of a vehicle.

Referring to FIG. 1, a vehicle may determine the actual speed of a motor in 101.

The vehicle may determine a model speed of the motor in 103.

The model speed of the motor means the ideal speed of the motor when no vibration occurs.

The vehicle may determine a vibration component based on the deviation of the model speed and the actual speed of the motor in 105.

The vehicle may perform high pass filtering on the vibration component to control an erroneous component included in the vibration component in 107.

The vehicle may apply a set time phase delay to the high pass filtered vibration component to compensate for a phase antecedence generated during the high pass filtering in 109.

In an exemplary embodiment of the present invention, the high pass filter (HPF) may pass signals with a frequency higher than a predetermined cutoff frequency.

The related art method of determining the model speed of the motor may have some errors because accurate determination is impossible. Accordingly, the vehicle may perform 107 and 109 to control the erroneous component in the model speed.

The vehicle may generate an anti-jerk torque by applying a set gain value to a vibration component to which set time phase delay is applied in 111.

The vehicle may generate a final output torque by applying the anti-jerk torque in 113.

In controlling the vehicle based on the final output torque generated in the same way as in FIG. 1 described above, when wheel slip occurs while the vehicle is traveling, there has been a problem in that the wheel slip component is included in the vibration component and thus the vibration component is erroneously extracted. For the present reason, deterioration of not only the vibration reduction performance but also the wheel slip control performance of the vehicle has occurred.

Figure 2:
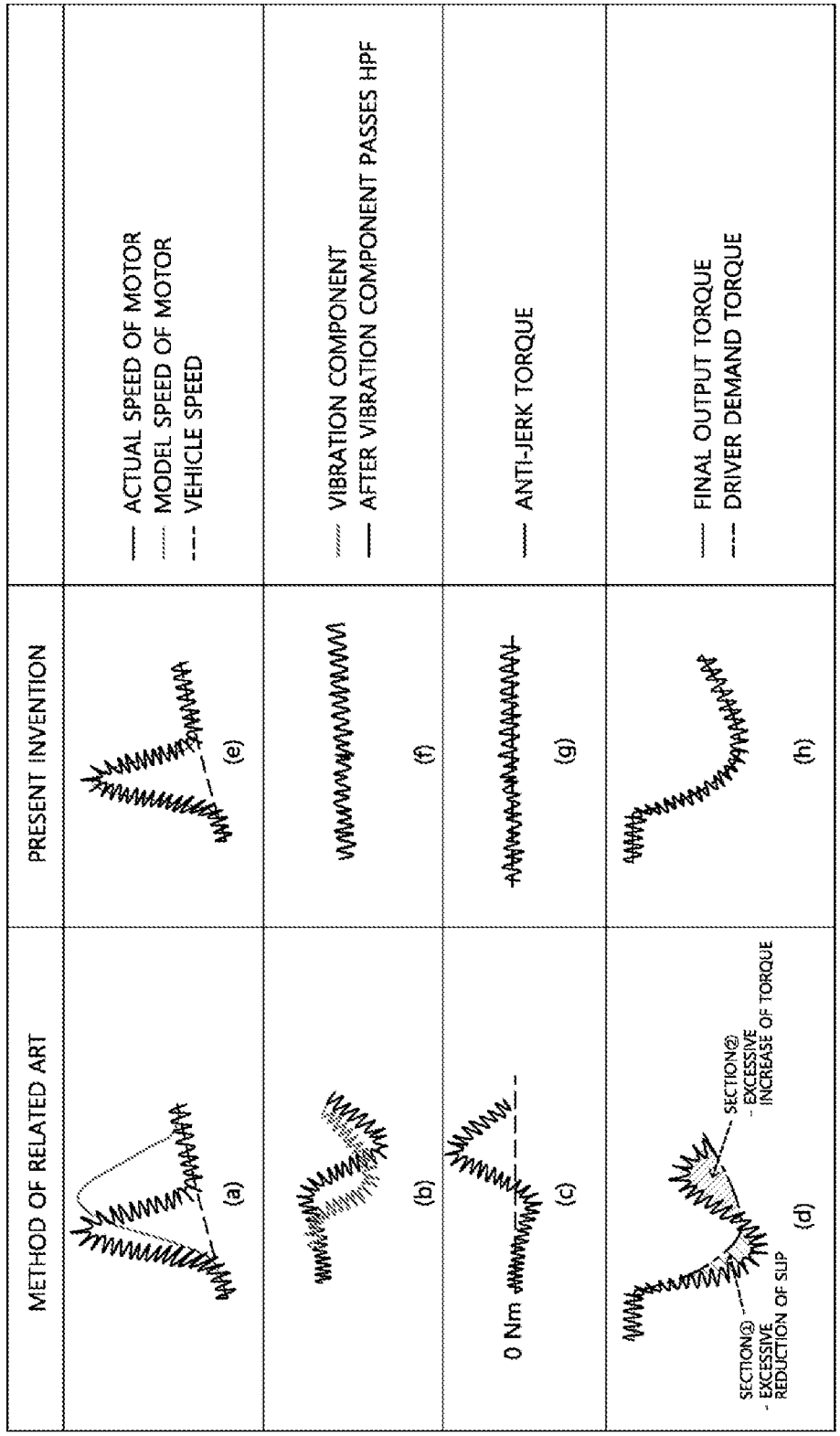
FIG. 2 and FIG. 3A and FIG. 3B explain a related art method of controlling driving of a vehicle when wheel slip occurs and a method according to various exemplary embodiments of the present disclosure of controlling a vehicle when wheel slip occurs.
Figure 3A:
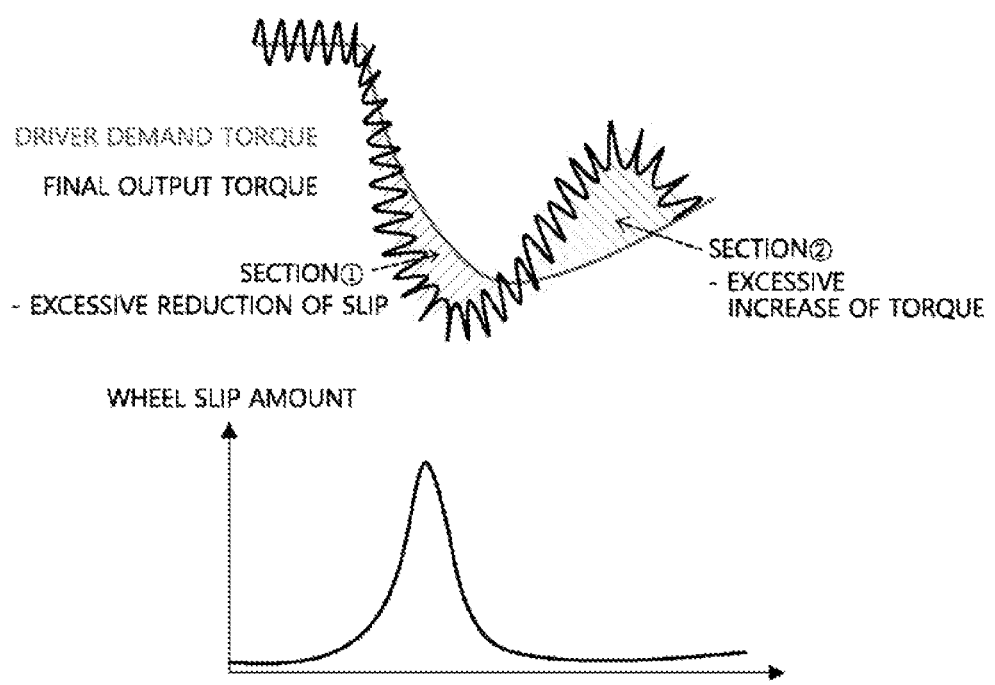
Figure 3B:
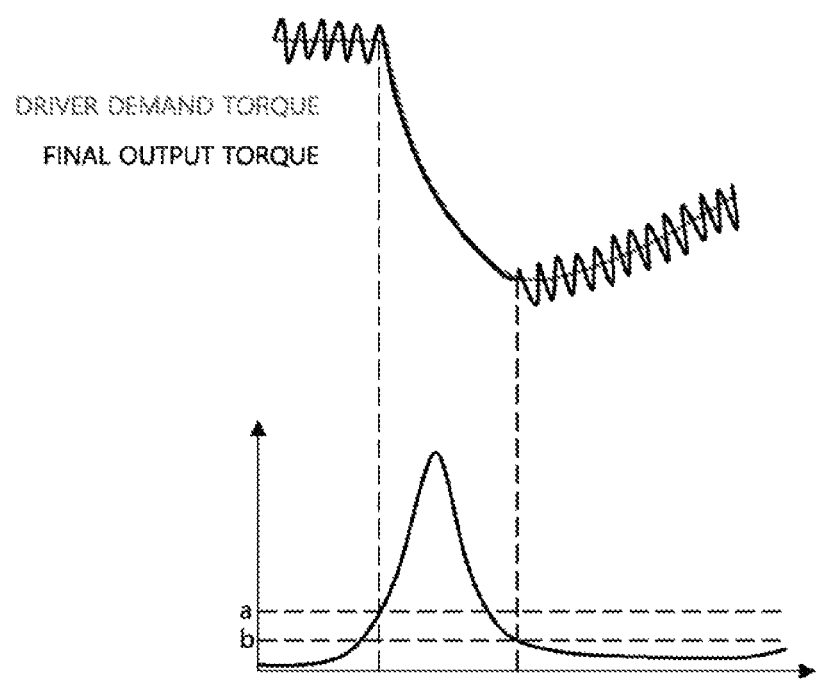

FIG. 2 and FIG. 3A and FIG. 3B explain the related art method of controlling driving of a vehicle when wheel slip occurs and a method according to various exemplary embodiments of the present disclosure of controlling a vehicle when wheel slip occurs.

Referring to (a) of FIG. 2, in a vehicle whose driving is controlled according to the related art method, when wheel slip occurs while the vehicle is traveling at an arbitrary speed, a wheel slip component at the actual speed of a motor precedes a wheel slip component at the model speed of the motor.

Accordingly, the wheel slip component is included in a vibration component, and the vibration component as shown in (b) of FIG. 2 may be generated.

Compared to the wheel slip component, the vibration component has a low frequency and a large size. Such a vibration component including a low frequency and a large size is different from a vibration component, which is to be controlled by anti-jerk, i.e., an anti-jerk torque as shown in (c) of FIG. 2, and thus is severely distorted after passing through a high pass filter (HPF) as shown in (b) of FIG. 2.

As a result, as shown in (d) of FIG. 2, there has been a problem in that a driver demand torque and a final output torque show a large difference, that is, at the beginning of wheel slip, the vehicle excessively reduces the slip (section ①), and when the torque increases after the slip is stabilized, the vehicle excessively increases the torque (section ②).

To remedy such a problem in the related art, embodiments of the present disclosure may provide a method and a system for controlling anti-jerk of a vehicle for improving the accuracy of vibration component extraction by reflecting a wheel slip component of a motor in the model speed of the motor when wheel slip of the vehicle occurs.

For example, referring to (e) of FIG. 2, the problem in the related art in which the wheel slip component of the motor speed precedes the wheel slip component of the model speed as shown in (a) of FIG. 2 may be solved in an exemplary embodiment of the present disclosure of the present disclosure by correcting the model speed of the motor when wheel slip occurs while the vehicle is traveling at an arbitrary speed. Furthermore, when the vibration component is extracted, the wheel slip component is canceled, and the vibration component may have a form as shown in (f) of FIG. 2 and may have a form similar to the anti-jerk torque as shown in (g) of FIG. 2. Accordingly, as shown in (f) of FIG. 2, after the vibration component passes through the high-pass filter, generation of distortion may be minimized unlike in the related art.

Accordingly, as shown in (h) of FIG. 2, driver demand torque and final output torque become similar to each other, and the above-described problem that has occurred in the related art may be solved.

Furthermore, to remedy the problem in the related art, an exemplary various exemplary embodiments of the present disclosure may provide a method and a system for controlling anti-jerk of a vehicle that disable an anti-jerk control function and only activate a wheel slip control function when wheel slip of a vehicle occurs.

In a vehicle whose driving is controlled according to the related art method, when wheel slip occurs, excessive slip reduction control is performed at the initial stage of wheel slip occurrence, and there is a large difference between the driver demand torque and the final output torque of the vehicle as shown in FIG. 3A. On the other hand, according to various exemplary embodiments of the present disclosure, when an anti-jerk control function is not operated when wheel slip of the vehicle occurs, the driver demand torque and the final output torque of the vehicle are similar to each other as shown in FIG. 3B.

Hereinafter, the working principle and embodiments of the present disclosure will be described with reference to the accompanying drawings.

Figure 4:
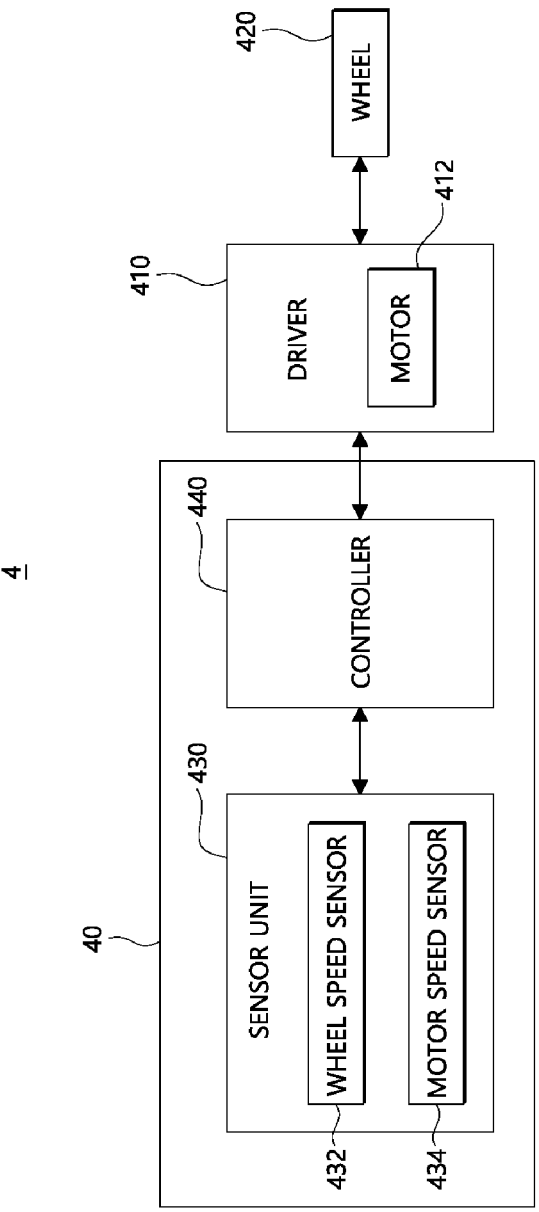
FIG. 4 is a block diagram illustrating the configuration of a vehicle including an anti-jerk control system according to an exemplary embodiment of the present disclosure.

FIG. 4 is a block diagram illustrating the configuration of a vehicle including an anti-jerk control system according to an exemplary embodiment of the present disclosure.

Referring to FIG. 4, a vehicle 4 may include a driver 410, a wheel 420, and an anti-jerk control system 40.

The driver 410, which is a driving source configured to drive the vehicle 4, may include a motor 412.

The motor 412 is a power source that provides driving force to the wheel 420 of the vehicle 4, and may be driven by receiving power from, for example, a battery of the vehicle 4.

The wheel 420 may be provided in plural, and may receive a driving force, i.e., a rotation force, from the motor 412 to move the vehicle 4. The wheel 420 may include a front wheel provided at the front of the vehicle 4 and a rear wheel provided at the rear of the vehicle 4.

Although not shown, a power transmission device such as a transmission and a driveshaft may interconnect the wheel 420 with the motor 412 so that the driving force generated by the motor 412 is provided to the wheel 420.

The anti-jerk control system 40 may include a sensor unit 430 and a controller 440.

The sensor unit 430 may obtain information on components of the vehicle 4, i.e., some devices of the vehicle 4 and/or sensor data (also referred to as "sensor signal") corresponding to the surrounding information of the vehicle 4.

The sensor unit 430 may include a wheel speed sensor 432 and/or a motor speed sensor 434.

The wheel speed sensor 432 may be provided on the wheel 420, and wheel speed information on the wheel 420 may be obtained from the signal of the wheel speed sensor 432.

Furthermore, the wheel speed sensor 432 may be provided in plural, and each of the wheel speed sensors 432 may be provided on a corresponding one of the wheels 420. The average speed of the plurality of wheels 420 of the vehicle 4 may be determined from the signals of the plurality of wheel speed sensors 432, and the vehicle speed may be determined from the average speed of the plurality of wheels 420 of the vehicle 4.

The motor speed sensor 434 may be provided in the motor 412 of the vehicle 4, and speed information on the motor 412 may be obtained from the signal of the motor sensor 434. For example, the motor speed sensor 434 may include a resolver.

The controller 440 may control devices of the vehicle 4 (e.g., the driver 410 and the sensor unit 430). The controller 440 may include an electronic control unit (ECU). The controller 440 may include a processor and a memory.

The controller 440 may correct the model speed of the motor 412 when wheel slip occurs while the vehicle 4 is traveling.

Whether wheel slip occurs may be determined based on the determination of the wheel slip amount.

The wheel slip amount is a result of determining the difference between the motor speed, which is the actual speed of the motor 412, and the actual speed of the vehicle 4, i.e., the vehicle speed, by use of the same units in the motor speed and the vehicle speed.

For example, the motor speed and the vehicle speed may be determined based on a signal output through the sensor unit 430. Determination of motor speed and vehicle speed is a known technique, and detailed description thereof will be omitted.

For example, the wheel slip amount may be determined by Equation 1 below.

$$\text{Wheel slip amount} = \text{motor speed(unit:kph)} - \text{vehicle speed(unit:kph)} \quad \text{[Equation 1]}$$

The controller 440 may determine that wheel slip has occurred when the wheel slip amount is equal to or greater than a predetermined threshold value, and otherwise determine that wheel slip has not occurred.

When the wheel slip amount is smaller than the predetermined threshold value, the controller 440 may control the driving of the vehicle 4 by generating an anti-jerk torque based on the model speed of the motor 412.

When the wheel slip amount is equal to or greater than the predetermined threshold value, the controller 440 may determine a correction factor for correcting a wheel slip region. For example, the correction factor may be determined with reference to FIG. 5.

Figure 5:
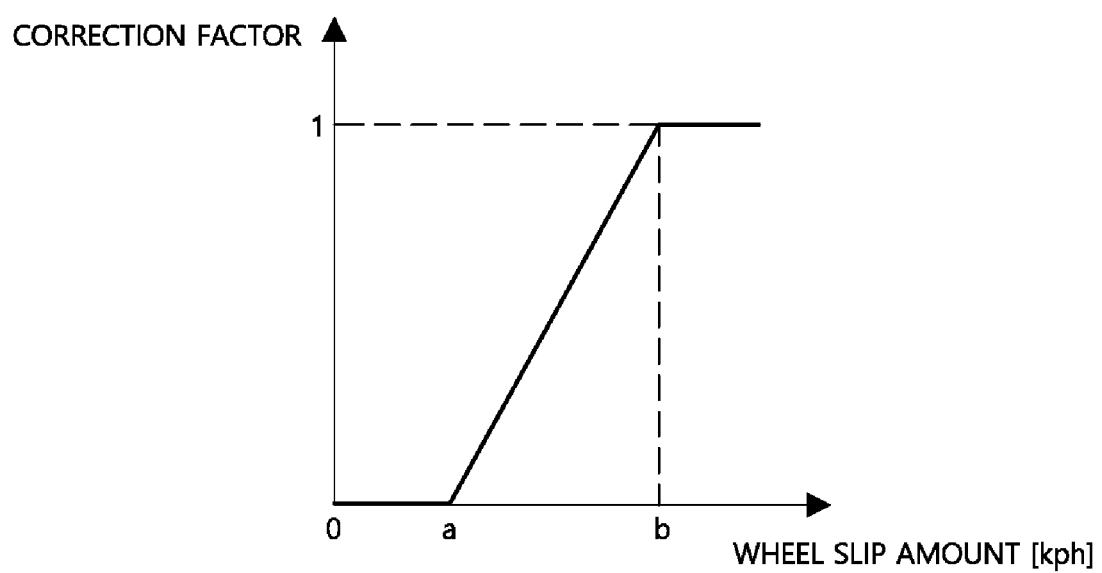
FIG. 5 is a graph illustrating the relationship between a wheel slip amount of a vehicle and a correction factor according to an exemplary embodiment of the present disclosure.

FIG. 5 is a graph illustrating the relationship between the wheel slip amount of the vehicle and the correction factor according to an exemplary embodiment of the present disclosure.

Referring to FIG. 5, the correction factor may be a predetermined value based on the wheel slip amount, and may be a value from 0 to 1.

The correction factor may correspond to a wheel slip amount greater than a predetermined first wheel slip amount a (also referred to as a predetermined first threshold value) and smaller than a predetermined second wheel slip amount b (also referred to as a predetermined second threshold value), and may be a predetermined value in proportion to (or directly proportional to) the wheel slip amount.

Accordingly, the determination of the corrected model speed based on the correction factor to be described later may be performed in response to the wheel slip amount being greater than the predetermined first wheel slip amount.

For example, the predetermined first wheel slip amount a may be 2, and the predetermined second wheel slip amount b may be 7 kph.

Furthermore, when the wheel slip amount is less than or equal to the predetermined first wheel slip amount a, the model speed of the motor 412 may not be corrected.

Meanwhile, the model speed of the motor 412 means an ideal motor speed when no vibration occurs, and may be a value determined and stored in advance.

The model speed of the motor 412 may be determined based on a motor torque command, load torque, gear stage information, traveling status, wheel speed, transmission input and output speed, vehicle mode, and the like. Determination of the model speed is a well-known technique, and a detailed description thereof will be omitted.

Hereinafter, the model speed may be referred to as a predetermined model speed.

The controller 440 may determine a corrected model speed from the model speed of the motor 412 based on the determined correction factor, and extract a vibration component based on the corrected model speed and the motor speed of the vehicle 4.

Figure 6:
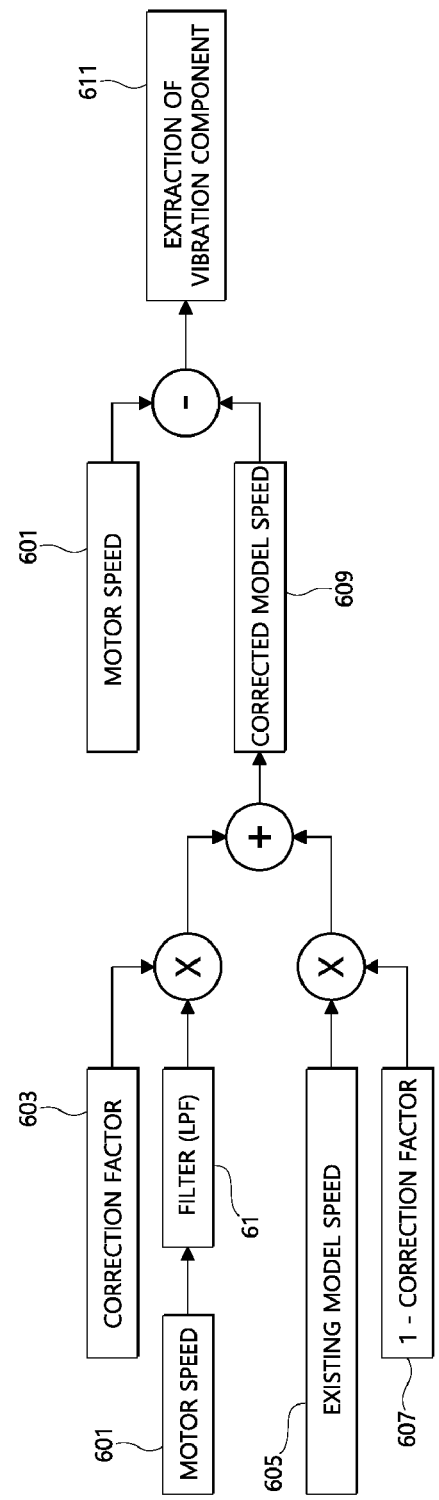
FIG. 6 is a diagram for explaining operations of determining a corrected model speed of a motor and extracting a vibration component based on the corrected model speed by an anti-jerk control system of a vehicle according to an exemplary embodiment of the present disclosure.

FIG. 6 is a diagram for explaining operations of determining a corrected model speed of the motor 412 and extracting a vibration component based on the corrected model speed by the anti-jerk control system 40 (and/or the controller 440) of the vehicle 4 according to an exemplary embodiment of the present disclosure.

Referring to FIG. 6, the controller 440 may input a motor speed 601, which is the actual speed of the motor 412, to a low pass filter (LPF) 61 to output a value in which the wheel slip component is included and the vibration component is removed.

In an exemplary embodiment of the present invention, the low pass filter (LPF) 61 may pass signals with a frequency lower than a predetermined cutoff frequency.

The controller 440 may determine a value (also referred to as a first result value) obtained by multiplying the correction factor 603 by the value in which the wheel slip component (also referred to as a backlash shock component) is included and the vibration component is removed from the motor speed 601 through low-pass filtering.

The controller 440 may determine a value (also referred to as a second result value) obtained by multiplying a previously determined existing model speed 605 of the motor 412 by a value 607 obtained by subtracting the correction factor from 1.

The controller 440 may determine the sum of the first result value and the second result value as a corrected model speed 609. Accordingly, the slip component is included and the vibration component is not included in the corrected model speed.

The controller 440 may extract a vibration component 611 by determining the difference between the motor speed 601 and the corrected model speed 609.

Since the vibration component is extracted through the corrected model speed as described above, the wheel slip component is canceled to remove an error, and thus the distortion problem in the related art may be solved when the vibration component is high-pass filtered.

Moreover, although not shown in FIG. 6, the controller 440 may generate anti-jerk torque by high-pass filtering and phase delay of the vibration component, and may generate the final output torque of the driver 410, i.e., the motor 412, based on the anti-jerk torque.

Furthermore, to solve the related art problem in that mutual collision occurs while wheel slip control and anti-jerk control are simultaneously performed when wheel slip occurs, the controller 440 may focus on wheel slip control and disable anti-jerk control when wheel slip having a predetermined size or more occurs.

When wheel slip occurs, that is, when the wheel slip amount is greater than the predetermined first threshold value a, the controller 440 may turn off the anti-jerk control function of the vehicle 4. Here, the controller 440 may turn on the wheel slip control function of the vehicle 4.

For example, the first threshold value may be 5 kph.

For example, the wheel slip control function may be configured to control the speed of the wheels 420 of the vehicle 4 by controlling driving force output from the driver 410 of the vehicle 4 (also referred to as driving torque or final output torque) or the braking force (also referred to as braking torque). The wheel slip control function may include controlling of adjusting the driving torque, output from the driver 410 in a direction to reduce the wheel slip amount, based on the actual vehicle speed and the wheel slip amount of the vehicle 4 which is in traveling.

For example, the anti-jerk control function may reduce (or suppress) vibration from the driver 410 of the vehicle 4 or vibration from the outside. The anti-jerk control function may include recognizing the difference between the model speed of the motor 412 and the motor speed, which is the actual speed of the motor 412, as a vibration component, removing an erroneous component included in the vibration component, generating an anti-jerk torque, and applying the anti-jerk torque to control the final output torque of the driver 410, i.e., the motor 412.

Furthermore, when the wheel slip is stabilized, that is, when the wheel slip amount is less than a predetermined second threshold value b, the controller 440 may turn on the turned-off anti-jerk control function.

For example, the second threshold value may be 2 kph.

Accordingly, when wheel slip occurs, the controller 440 disables the anti-jerk control function and at the same time blocks the wheel slip component from being reflected in the model, preventing distortion in the vibration component even when the controller 440 operates the anti-jerk control again after the wheel slip control.

The operation of disabling the anti-jerk control function when wheel slip of the vehicle 4 occurs is simpler than the operation of controlling driving of the vehicle 4 based on the corrected model speed described above, and thus the wheel slip control performance may be easily improved.

However, the operation of disabling the anti-jerk control function when wheel slip occurs may cause a problem in that vibration reduction performance deteriorates when vibration of the vehicle 4 occurs during wheel slip control.

For the present reason, the operation of disabling the anti-jerk control function when wheel slip occurs may be applied when it is important to secure safety of the vehicle 4 through wheel slip control rather than the drivability of the vehicle 4, such as when the vehicle 4 is traveling on a low-friction road.

Figure 7:
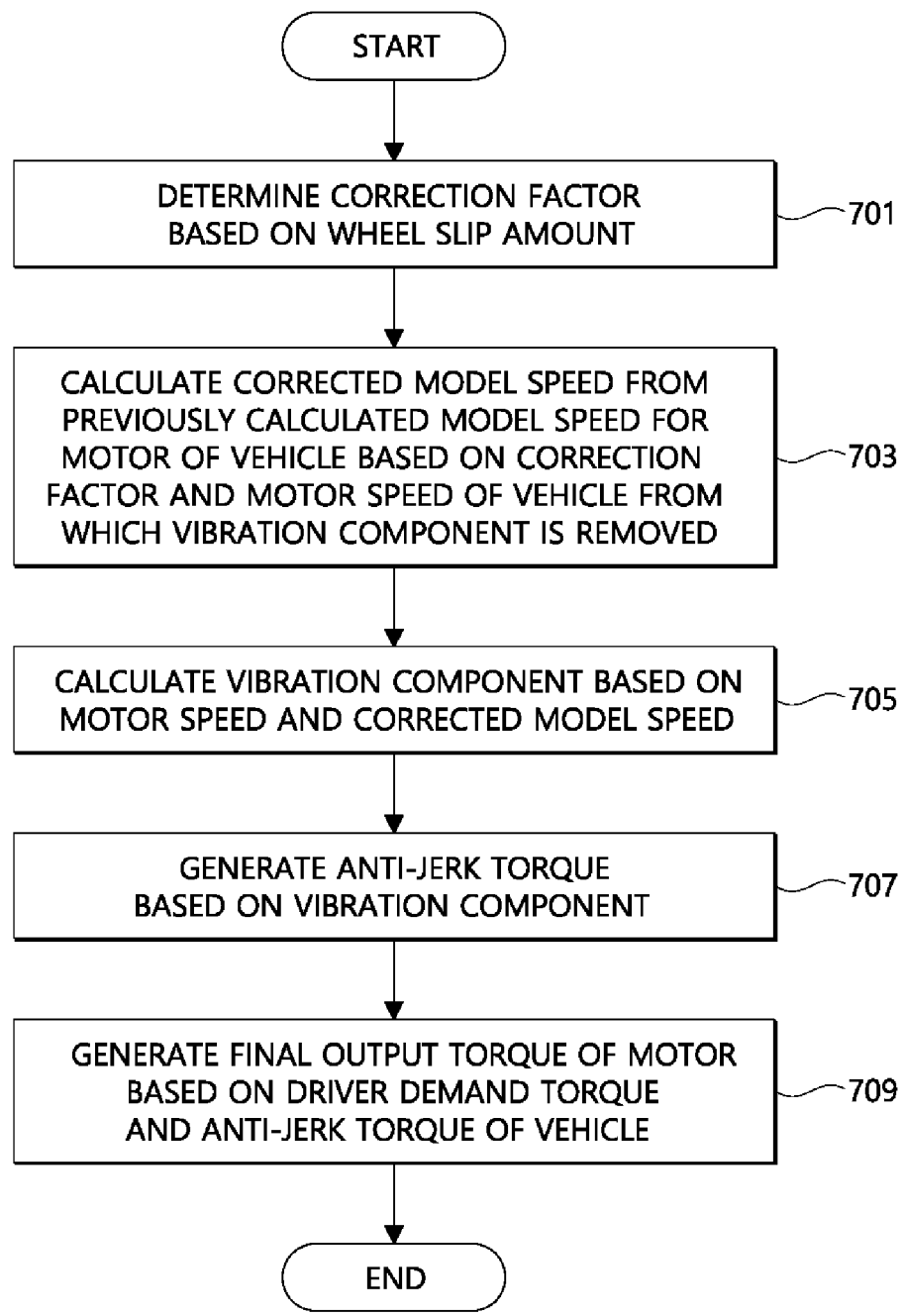
FIG. 7 is a flowchart of an operation of an anti-jerk control system of a vehicle according to an exemplary embodiment of the present disclosure.

FIG. 7 is a flowchart of the operation of the anti-jerk control system 40 (and/or the controller 440) of the vehicle 4 according to an exemplary embodiment of the present disclosure.

Referring to FIG. 7, when wheel slip of the vehicle 4 occurs, the anti-jerk control system 40 may reflect the wheel slip component of the motor 412 in the model speed of the motor 412 to improve the accuracy of vibration component extraction.

To the present end, the anti-jerk control system 40 may determine a correction factor based on the wheel slip amount of the vehicle 4 in 701.

The wheel slip amount of the vehicle 4 may be determined based on the difference between the motor speed of the vehicle 4 and the speed of the vehicle 4.

The correction factor may be a predetermined value in proportion to the wheel slip amount when the wheel slip amount is greater than the predetermined first threshold value and less than the predetermined second threshold value.

The anti-jerk control system 40 may, based on the correction factor and the motor speed of the vehicle 4 from which the vibration component is removed, determine a corrected model speed from the predetermined model speed for the motor 412 of the vehicle 4 in 703.

The motor speed of the vehicle 4 from which the vibration component is removed is a value determined by low-pass filtering the motor speed of the vehicle 4, and may include a wheel slip component.

The corrected model speed may be determined by adding the first result value, obtained by multiplying the correction factor by the motor speed of the vehicle 4 from which the vibration component is removed, to the second result value, obtained by multiplying the predetermined model speed by the value obtained by subtracting the correction factor from 1. For example, the correction factor may be a value from 0 to 1.

The vehicle 4 may determine a vibration component based on the motor speed and the corrected model speed in 705.

The vibration component may be a difference value between the motor speed and the corrected model speed.

The anti-jerk control system 40 may generate an anti-jerk torque based on the vibration component in 707.

The anti-jerk torque may be generated by high-pass filtering the vibration component, phase delaying the high-pass filtered vibration component, and applying a predetermined gain value to the phase-delayed vibration component.

The anti-jerk control system 40 may generate a final output torque of the motor 412 based on the driver demand torque and the anti-jerk torque of the vehicle 4 in 709.

In other words, the anti-jerk control system 40 may determine the final output torque of the motor by adding the driver demand torque of the vehicle 4 to the anti-jerk torque of the vehicle 4.

The driver demand torque may be determined based on driving data by the driver of the vehicle 4.

For example, the driving data may be obtained by measuring the degree to which the driver depresses an the accelerator pedal or a brake pedal (also referred to as a position value) using an accelerator position sensor (APS) or a brake position sensor (BPS) included in the sensor unit 430 of the vehicle 4 according to the action of the driver depressing the accelerator pedal or the brake pedal of the vehicle 4.

For example, the driver demand torque may reflect the driver's will to control the vehicle 4.

Figure 8:
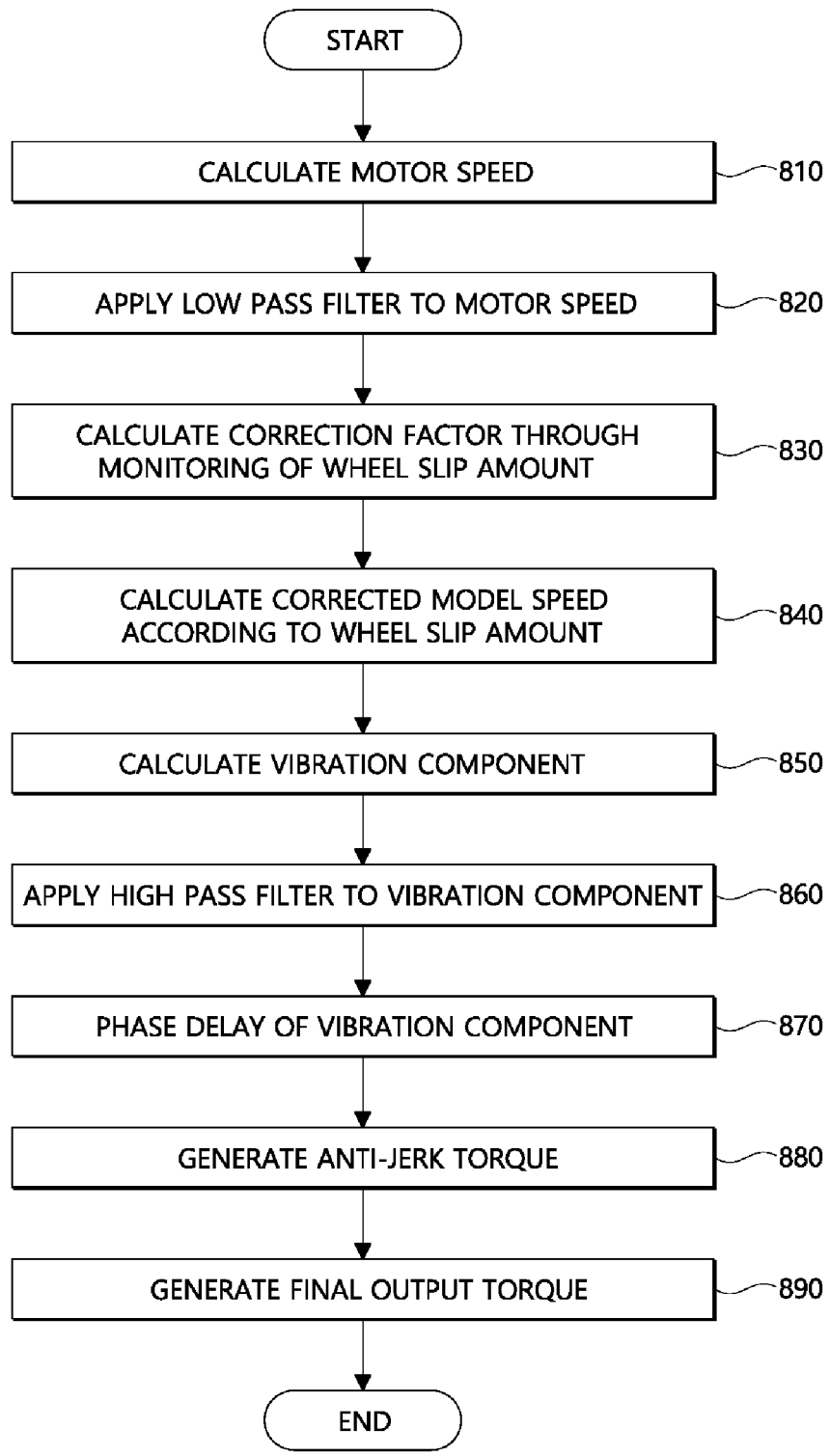
FIG. 8 is a flowchart of an operation of an anti-jerk control system according to an exemplary embodiment of the present disclosure.

FIG. 8 is a flowchart of the operation of the anti-jerk control system 40 (and/or the controller 440) according to an exemplary embodiment of the present disclosure.

Referring to FIG. 8, the anti-jerk control system 40 may determine a correction factor through monitoring of the wheel slip amount of the vehicle 4 and determine the corrected model speed according to the wheel slip amount of the vehicle 4 using the correction factor, improving the accuracy of vibration component extraction.

To the present end, the anti-jerk control system 40 may determine the motor speed which is the actual speed of the motor 412 of the vehicle 4 in 810.

The anti-jerk control system 40 may determine the motor speed which is the actual speed of the motor 412 using the motor speed sensor 434.

The anti-jerk control system 40 may apply the low-pass filter to the motor speed to remove the vibration component from the motor speed in 820.

The anti-jerk control system 40 may output the motor speed in which the wheel slip component is included and the vibration component is removed by low-pass filtering the motor speed.

The anti-jerk control system 40 may determine the correction factor through monitoring of the wheel slip amount of the vehicle 4 in 830.

For example, when the wheel slip amount of the vehicle 4 is greater than the predetermined first threshold value and smaller than the predetermined second threshold value, the correction factor may be determined in proportion to the wheel slip amount.

The anti-jerk control system 40 may determine the corrected model speed according to the wheel slip amount based on the correction factor in 840.

The anti-jerk control system 40 may determine the corrected model speed of the motor 412 using Equation 2 below.

$$C = (B \times \text{correction factor}) + (\text{existing model speed} \times \text{existing correction factor predetermined to correspond to the existing model}) \quad \text{[Equation 2]}$$

(C: corrected model speed, B: motor speed to which low pass filter is applied)

The anti-jerk control system 40 may determine the vibration component by subtracting the calibrated model speed from the motor speed in 850.

The anti-jerk control system 40 may apply the high-pass filter to the determined vibration component to reduce an erroneous component in the determined vibration component in 860.

For example, applying the high-pass filter to the determined vibration component may remove the erroneous component expressed as a function greater than or equal to a linear function based on the Laplace transform. Applying the high-pass filter to the vibration component is a known technique in the related art, and a detailed description thereof will be omitted.

For example, the high-pass filter in the exemplary embodiment of the present disclosure may apply a time constant having the same magnitude as that of the related art method, and even when the related art high-pass filter is used, because the error in the determined vibration component is small, distortion may be smaller than that of the related art.

Furthermore, because the vibration component determined in the exemplary embodiment of the present disclosure has a smaller error compared to the vibration component determined according to the related art method, a high time constant of the high-pass filter may be applied, unlike the related art high-pass filter, and accordingly, the occurrence of distortion may be further reduced.

The anti-jerk control system 40 may set the phase delay of the high-pass filtered vibration component according to the application of the high-pass filter in 870.

For example, the phase delay may include applying a preset time phase delay to the high pass filtered vibration component to compensate for the phase advance having occurred during the high pass filtering. Applying the time phase delay to the high-pass filtered vibration component is a known technique in the related art, and a detailed description thereof will be omitted.

The anti-jerk control system 40 may generate an anti-jerk torque by applying a preset gain value to the phase-delayed vibration component in 880.

The anti-jerk control system 40 may determine the anti-jerk torque by multiplying the phase-delayed vibration component by the preset gain value.

For example, the gain value may be a preset value based on a traveling mode, gear stage information, and/or traveling status of the vehicle.

The anti-jerk control system 40 may generate a final output torque based on the anti-jerk torque and the driver demand torque in 890.

The anti-jerk control system 40 may generate the final output torque by adding the driver demand torque to the anti-jerk torque.

Figure 9:
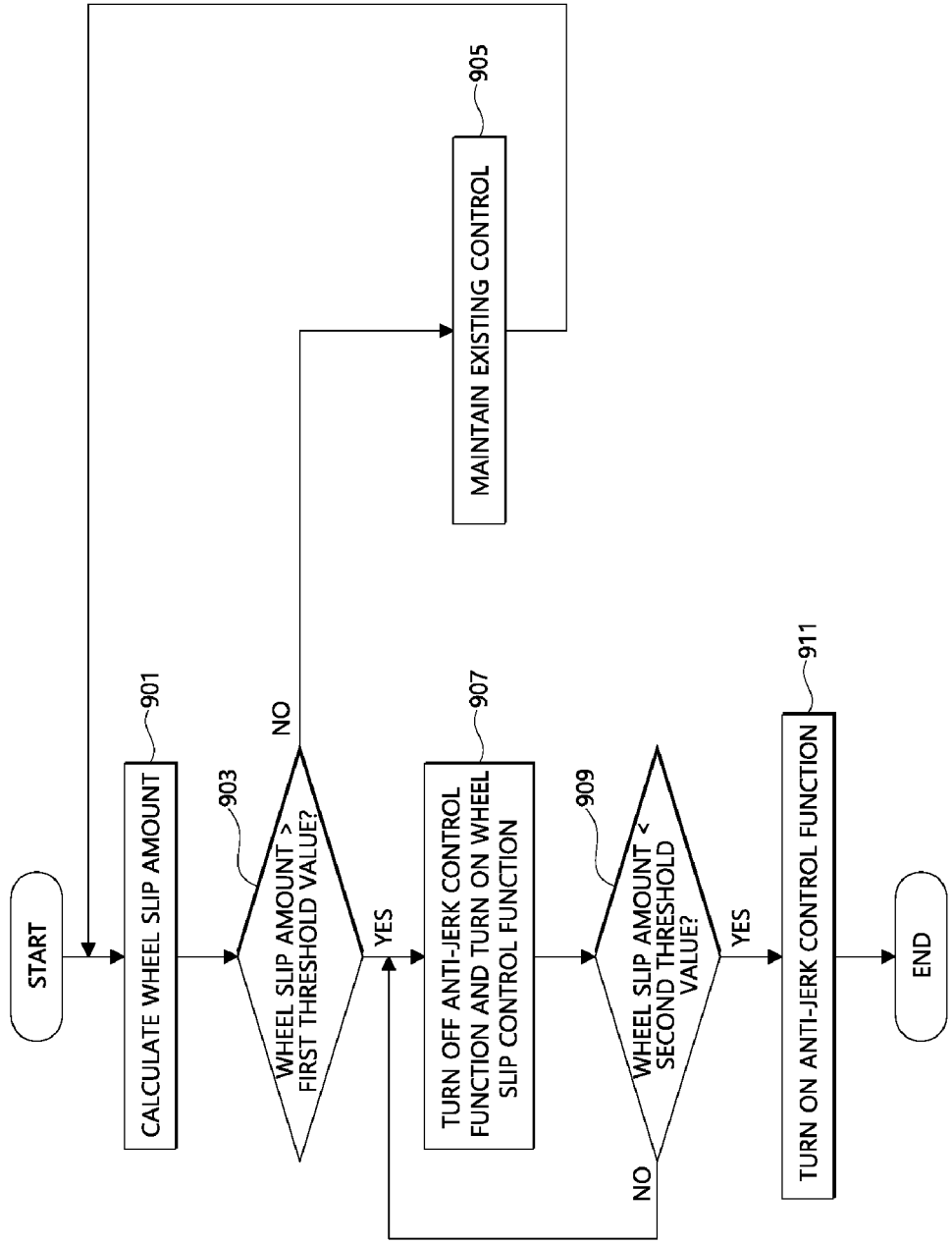
FIG. 9 is a flowchart of an operation of an anti-jerk control system according to an exemplary embodiment of the present disclosure.

FIG. 9 is a flowchart of the operation of the anti-jerk control system 40 (and/or the controller 440) according to an exemplary embodiment of the present disclosure.

Referring to FIG. 9, when wheel slip occurs, the anti-jerk control system 40 may remedy the related art problem in that mutual collision occurs while wheel slip control and the anti-jerk control are simultaneously performed.

To the present end, the anti-jerk control system 40 may determine the wheel slip amount in 901.

The anti-jerk control system 40 may determine whether the wheel slip amount is greater than the predetermined first threshold value in 903.

The anti-jerk control system 40 may perform 907 when the wheel slip amount is greater than the first threshold value, and may perform 905 otherwise.

The anti-jerk control system 40 may maintain the existing driving control in 905.

The anti-jerk control system 40 may turn off the anti-jerk control function and turn on the wheel slip control function so that the anti-jerk control is not executed and only the wheel slip control is executed in 907.

The anti-jerk control system 40 may determine whether the wheel slip amount is smaller than the predetermined second threshold value in 909.

The anti-jerk control system 40 may perform 911 when the wheel slip amount is less than the predetermined second threshold value, and may maintain 907 otherwise.

The anti-jerk control system 40 may turn on the anti-jerk control function so that the anti-jerk control is executed again in 911.

The method and system for controlling anti-jerk of a vehicle according to various exemplary embodiments of the present disclosure may remedy the problem in which a vibration component is incorrectly extracted when wheel slip occurs during vibration reduction through anti-jerk control of the related art vehicle, for example, an electric vehicle.

Accordingly, the method and system for controlling anti-jerk of a vehicle according to various exemplary embodiments of the present disclosure may improve the vibration (or shake or shudder) of the vehicle and the feeling of the start-up delay due to the excessive slip reduction when the vehicle controls wheel slip.

Furthermore, the method and system for controlling anti-jerk of a vehicle according to various exemplary embodiments of the present disclosure may improve the reoccurrence of slip of the vehicle and the feeling of acceleration due to the excessive increase in torque when the torque is increased after controlling the wheel slip of the vehicle.

Furthermore, the method and system for controlling anti-jerk of a vehicle according to various exemplary embodiments of the present disclosure may improve the responsiveness of the wheel slip control of the vehicle when it is urgent to secure the safety of the vehicle due to the occurrence of wheel slip of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling anti-jerk of a vehicle, the method comprising:
    obtaining, by a controller, a motor speed of the vehicle by use of a sensor, wherein the motor speed includes a wheel slip component and a vibration component;
    determining, by the controller, a first motor speed which is obtained by subtracting the vibration component from the motor speed;
    determining, by the controller, a correction factor based on a wheel slip amount of the vehicle;
    determining, by the controller, a corrected model speed from a predetermined model speed for a motor of the vehicle based on the correction factor and the first motor speed, wherein the corrected model speed includes the wheel slip component;
    determining, by the controller, the vibration component based on the motor speed and the corrected model speed, and generating, by the controller, an anti-jerk torque based on the determined vibration component; and
    generating, by the controller, a final output torque of the motor based on a driver demand torque of the vehicle and the generated anti-jerk torque.

2. The method of claim 1, wherein the wheel slip amount of the vehicle is determined based on a difference between the motor speed of the vehicle and a speed of the vehicle.

3. The method of claim 1, wherein the correction factor is determined in proportion to the wheel slip amount when the controller concludes that the wheel slip amount of the vehicle is greater than a predetermined first threshold value and smaller than a predetermined second threshold value.

4. The method of claim 1,
    wherein the first motor speed is determined by low-pass filtering the motor speed of the vehicle.

5. The method of claim 1,
    wherein the correction factor has a value from 0 to 1, and
    wherein the corrected model speed is determined by adding a first result value obtained by multiplying the correction factor by the first motor speed, to a second result value obtained by multiplying the predetermined model speed by a value obtained by subtracting the correction factor from 1.

6. The method of claim 1, wherein the anti-jerk torque is generated by high-pass filtering the vibration component, phase delaying the high-pass filtered vibration component, and applying a predetermined gain value to the phase-delayed vibration component.

7. The method of claim 1, wherein the controlling of the anti-jerk torque is performed when the controller concludes that the wheel slip amount is smaller than a predetermined threshold value.

8. A method of controlling anti-jerk of a vehicle, the method comprising:
    determining, by a controller, a wheel slip amount of the vehicle;
    turning off, by the controller, an anti-jerk control function of the vehicle and turning on, by the controller, a wheel slip control function of the vehicle when the controller concludes that the wheel slip amount is greater than a predetermined first threshold value; and
    maintaining, by the controller, existing control of the vehicle when the controller concludes that the wheel slip amount is less than or equal to the predetermined first threshold value.

9. The method of claim 8, further including turning on, by the controller, the anti-jerk control function when the controller concludes that the wheel slip amount is smaller than a predetermined second threshold value after turning off the anti-jerk control function of the vehicle.

10. A system for controlling anti-jerk of a vehicle, the system comprising:
    a sensor unit; and
    a controller electrically connected to the sensor unit,
    wherein the controller is configured to:
        obtain a motor speed of the vehicle by use of a sensor, wherein the motor speed includes a wheel slip component and a vibration component,
        determine a first motor speed which is obtained by subtracting the vibration component from the motor speed,
        determine a wheel slip amount of the vehicle from an output signal of the sensor unit, and determine a correction factor based on the wheel slip amount,
        determine a corrected model speed from a predetermined model speed for a motor of the vehicle based on the correction factor and the first motor speed,
        determine the vibration component based on the motor speed and the corrected model speed, and generate an anti-jerk torque based on the determined vibration component, and
        generate a final output torque of the motor based on a driver demand torque of the vehicle and the generated anti-jerk torque.

11. The system of claim 10, wherein the controller is configured to determine the wheel slip amount based on a difference between the motor speed of the vehicle and a speed of the vehicle.

12. The system of claim 10, wherein the correction factor is determined in proportion to the wheel slip amount when the controller concludes that the wheel slip amount of the vehicle is greater than a predetermined first threshold value and smaller than a predetermined second threshold value.

13. The system of claim 10,
    wherein the controller is configured to determine the first motor speed by low-pass filtering the motor speed of the vehicle.

14. The system of claim 10,
    wherein the correction factor has a value from 0 to 1, and
    wherein the controller is configured to add a first result value obtained by multiplying the correction factor by the first motor speed, to a second result value obtained by multiplying the predetermined model speed by a value obtained by subtracting the correction factor from 1, to determine the corrected model speed.

15. The system of claim 10, wherein the controller is configured to generate the anti-jerk torque by high-pass filtering the vibration component, phase delaying the high-pass filtered vibration component, and applying a predetermined gain value to the phase-delayed vibration component.

16. The system of claim 10, wherein the controlling of the anti-jerk torque is performed when the controller concludes that the wheel slip amount is smaller than a predetermined threshold value.

\* \* \* \* \*